US012798492B2

(12) United States Patent
Xiao

(10) Patent No.: US 12,798,492 B2
(45) Date of Patent: Nov. 17, 2026

(54) SUPPORT FOR DISPLAY APPARATUS

(71) Applicant: Jolly Innovation Technology Co., Ltd., Guangzhou (CN)

(72) Inventor: Li Xiao, Shenzhen (CN)

(73) Assignee: Jolly Innovation Technology Co., Ltd., Guangzhou (CN)

( * ) Notice: Subject to any disclaimer, the term of this patent is extended or adjusted under 35 U.S.C. 154(b) by 51 days.

(21) Appl. No.: 19/019,870

(22) Filed: Jan. 14, 2025

(65) Prior Publication Data

US 2025/0388178 A1 Dec. 25, 2025

(30) Foreign Application Priority Data

Jun. 25, 2024 (CN) ........................ 202421470248.X

(51) Int. Cl.
*B60R 11/02* (2006.01)
*B60R 11/00* (2006.01)

(52) U.S. Cl.
CPC ... *B60R 11/0229* (2013.01); *B60R 2011/0082* (2013.01); *B60R 2011/0085* (2013.01)

(58) Field of Classification Search
CPC ......... B60R 11/0229; B60R 2011/0082; B60R 2011/0085
USPC ......... 248/277.1, 274.1, 276.1, 282.1, 279.1, 248/285.1; 361/679.01, 679.02, 679.06, 361/679.07, 679.21
See application file for complete search history.

(56) References Cited

U.S. PATENT DOCUMENTS

| | | | | |
|---|---|---|---|---|
| 6,102,350 | A * | 8/2000 | Cyrell | A47B 81/06 248/316.1 |
| 7,175,152 | B2 * | 2/2007 | Dittmer | F16M 13/02 248/222.51 |
| 7,448,584 | B2 * | 11/2008 | Chen | F16M 13/02 248/920 |
| 7,487,943 | B1 * | 2/2009 | Gillespie | F16M 11/10 248/920 |
| 7,663,868 | B1 * | 2/2010 | Lam | H05K 5/0204 361/679.06 |
| 8,251,325 | B2 * | 8/2012 | Molter | F16M 13/02 248/222.51 |
| 8,427,818 | B2 * | 4/2013 | Liu | F16M 11/046 361/679.01 |
| 8,628,051 | B2 * | 1/2014 | Huang | F16M 11/2014 248/920 |

(Continued)

*Primary Examiner* — Terrell L McKinnon
*Assistant Examiner* — Michael McDuffie
(74) *Attorney, Agent, or Firm* — ScienBiziP, P.C.

(57) ABSTRACT

The present disclosure provides a stand, including: a fixing plate configured to mount fix the stand on an object, a mounting plate configured to mount the display apparatus, and a rotating arm rotatably connected to the fixing plate and the mounting plate, a locking apparatus disposed on the fixing plate, the locking apparatus comprising a locking member attached to the fixing plate and movable relative to the fixing plate, and a base, the locking member comprises a first locking rod and a second locking rod arranged at relative intervals, and a connecting rod for connecting the first locking rod and the second locking rod, a locking plate disposed on the mounting plate, when the rotating arm is be folded, the locking plate may be engaged in the locking apparatus, so that the mounting plate is locked to the fixing plate.

20 Claims, 5 Drawing Sheets

(56) References Cited

U.S. PATENT DOCUMENTS

| | | | | |
|---|---|---|---|---|
| 8,827,226 | B2 * | 9/2014 | Townsend | F16M 11/2092 248/920 |
| 8,888,062 | B2 * | 11/2014 | Novin | F16M 11/2014 361/679.01 |
| 10,010,177 | B1 * | 7/2018 | Pei | F16M 13/02 |
| 10,064,489 | B2 * | 9/2018 | Sculler | F16M 13/02 |
| 11,662,055 | B2 * | 5/2023 | Vlaar | F16M 11/24 248/125.7 |
| 12,146,605 | B1 * | 11/2024 | Xiao | F16M 13/02 |
| 2002/0011544 | A1 * | 1/2002 | Bosson | F16M 11/041 248/274.1 |
| 2006/0291152 | A1 * | 12/2006 | Bremmon | F16M 11/10 361/679.06 |
| 2008/0029669 | A1 * | 2/2008 | Olah | F16M 11/2014 248/276.1 |
| 2010/0123061 | A1 * | 5/2010 | Vlies | F16M 11/10 248/231.91 |
| 2010/0214729 | A1 * | 8/2010 | Dittmer | F16M 11/14 361/679.01 |

* cited by examiner

100

SUPPORT FOR DISPLAY APPARATUS

RELATED APPLICATIONS

This application claims the benefit of priority to Chinese Patent Application Number 202421470248.X filed on Jun. 25, 2024, in the China National Intellectual Property Administration. The entire contents of the above-identified application are hereby incorporated by reference.

TECHNICAL FIELD

The present disclosure relates to the field of adjustable support, and specifically, to a support for display apparatus.

BACKGROUND

A recreational vehicle is a movable vehicle type including basic infrastructure for home. Generally, in the recreational vehicle, a display apparatus such as a tablet and/or a television can be used for entertainment and leisure purposes. The recreational vehicle needs to travel on different roads, so it is required that the display apparatus be securely fixed. Meanwhile, it is required that the display apparatus in the recreational vehicle can be viewed from multiple angles. Generally, a conventional support is directly and fixedly connected to a wall of the recreational vehicle, and then the display apparatus is fixedly connected to the support.

However, in many cases, users need to adjust viewing angles according to the situation. Thus, there are requirements from users to improve the display apparatus.

BRIEF DESCRIPTION OF THE DRAWINGS

The drawings exemplarily illustrate embodiments and form a part of the specification, which, together with the textual description of the specification, are used to explain exemplary embodiments of the embodiments. It is obvious that the drawings described below are only some embodiments of the present utility model. For those skilled in the art, other drawings can be obtained based on these drawings without creative labor. In all drawings, the same reference numerals refer to similar but not necessarily identical elements.

DESCRIPTION

The present disclosure is further described below with reference to the accompanying drawings and embodiments. The technical solutions in the implementations of the present disclosure will be clearly and completely described below with reference to the drawings in the implementations of the present disclosure. Obviously, the described implementations are only a part of the implementations of the present disclosure, rather than all the implementations. Based on the implementations of the present disclosure, all other implementations obtained by those ordinary skilled in the art without creative efforts fall within the scope of protection of the present disclosure.

Figure 1:
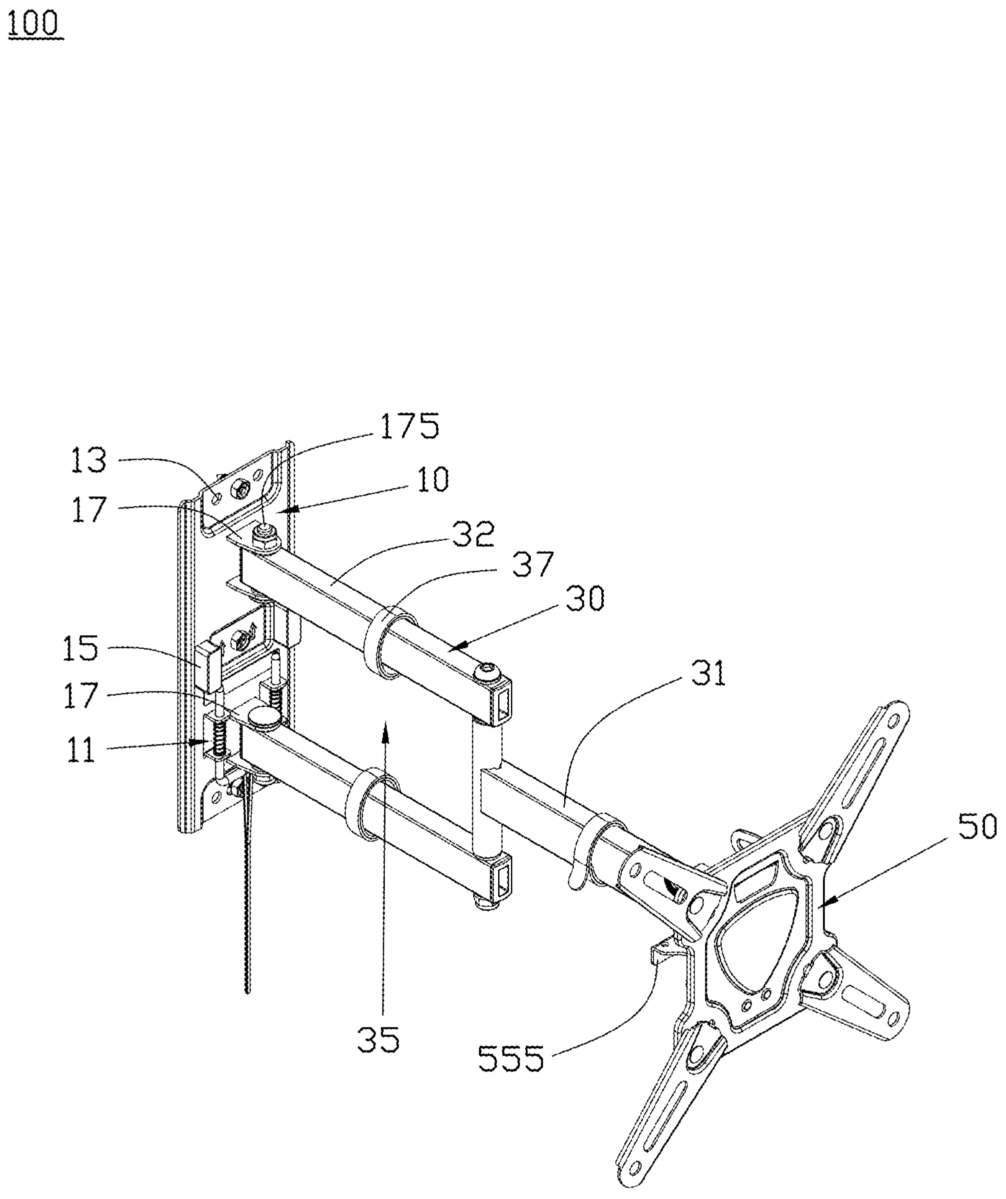
FIG. 1 is a perspective view of a support for a display apparatus of an embodiment of the present disclosure.

As illustrated in FIG. 1, a support 100 for a display apparatus of an embodiment is provided to be mounted to a fixing object (not shown). The fixing object may be a recreational vehicle, a ceiling, a wall, etc. The support 100 includes a fixing plate 10 fixedly connected to the fixing object, a mounting plate 50 for mounting the display apparatus, and a rotating arm 30 rotatably connected between the fixing plate 10 and the mounting plate 50. Specifically, one surface of the fixing plate 10 is attached to the fixing object, and an opposite surface of the fixing plate 10 is rotatably connected to one end of the rotating arm 30. An opposite end of the rotating arm 30 is rotatably connected to the mounting plate 50. The fixing plate 10, the rotating arm 30, and the mounting plate 50 are connected in sequence. Therefore, the support 100 is switchable between a folded state and an unfolded state. When the support 100 is rotated to be the folded state, the support 100 is capable of being operated to be a locked state. In this state, the support 100 cannot rotate. After the support 100 is operated to unlock from the locked state, the support 100 is capable of rotating to the unfolded state from the folded state.

Figure 5:
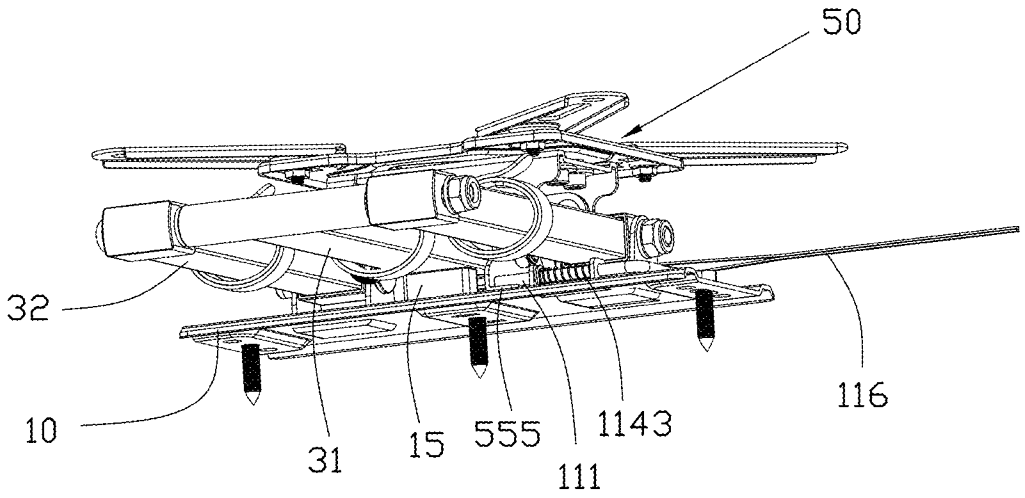
FIG. 5 is a perspective view of the support of the display apparatus in a folded state.

The fixing plate 10 may be a rectangular plate. Several fixing holes 13 are uniformly defined at different positions of the fixing plate 10, so that the fixing plate 10 is fixedly mounted to the fixing object by cooperations of the fixing holes 13 and screws. A plurality of engaging blocks 15 are disposed on the middle of the fixing plate 10. The engaging blocks 15 are arranged along a width direction of the fixed plate 10. Referring to FIG. 5, when the support 100 is in the folded state, a top surface of the engaging block 15 is contacted with a sidewall of the rotating arm 30, thereby preventing the rotating arm 30 from over-rotating towards the fixing plate 10. Thereby ensure that the display apparatus is parallel to the fixing plate 10. When the fixing plate 10 is mounted to a horizontal fixing object, the display apparatus is held to be horizontal, in order to improve the use experience. When the rotating arm 30 is rotated to be parallel to the fixing plate 10, the thickness of the engaging block 15 is a distance between the rotating arm 30 and the fixing plate 10.

As illustrated in FIG. 1, in this embodiment, two sets of mounting pieces 17 are vertically extended from a top wall of the fixing plate 10. The two sets of mounting pieces 17 are respectively disposed at opposite ends along a length direction of the top wall of the fixing plate 10. Each set of mounting pieces 17 comprises a first mounting piece and a second mounting piece, which are arranged at intervals along the length direction of the fixing plate 10. A rotating space 173 is defined between the first and second mounting pieces of each set of mounting pieces 17. The rotating arm 30 is connected to the two mounting pieces of each set of mounting pieces 17 with two ends of the rotating arm 30 received in the rotating space 173. It can be understood that the number of sets of mounting pieces 17 is not limited and is depended on actual needs.

Figure 4:
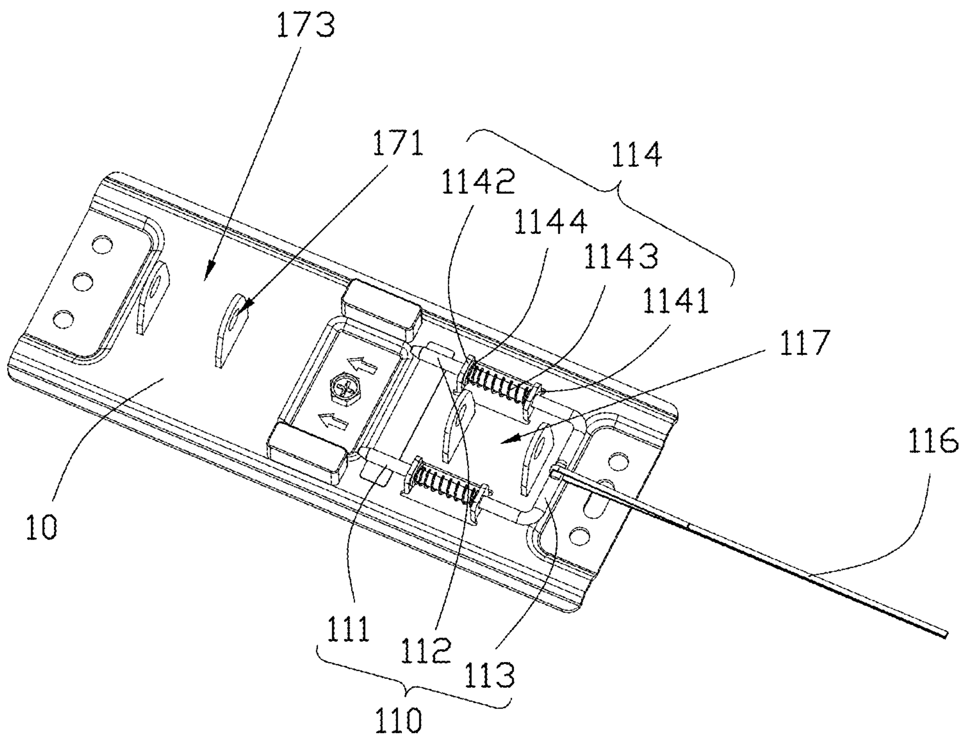
FIG. 4 is a perspective view of an assembly of a fixing plate and a locking apparatus of the support for the display apparatus.

As illustrated in FIG. 1, and FIG. 4, a locking apparatus 11 is disposed at one end of the top wall of the fixing plate 10. The locking apparatus 11 may include at least one base 114 and a locking member 110 and at least one elastic member 1143. The locking member is attached to the at least one base 114 and movable relative to the at least one base 114. The locking member 110 includes a connecting rod 113, a first locking rod 111 and a second locking rod 112. An operating member 116 is coupled to the locking member 110. In this embodiment, the operating member 116 is a pull rope which is attached to the connecting rod 113. The first locking rod 111 and the second locking rod 112 are connected with the connecting rod 113 and vertically extended from opposite ends of the connecting rod 113. Specifically, the locking member 110 is disposed to be parallel to the fixing plate 10, while the first locking rod 111 and the second locking rod 112 are spaced with each other and disposed between the engaging blocks 15 and the connecting rod 113. The first locking rod 111, the connecting rod 113, and the second locking rod 112 are connected in sequence. The first locking rod 111 and the second locking rod 112 are relatively parallel and arranged at intervals, thereby forming a U-shaped groove 117. Two sets of mounting pieces 17 are spaced at opposite sides of the engaging blocks 15 with one set of mounting pieces 17 being received in the U-shaped groove 117. The mounting pieces 17 may be disposed to be parallel to the connecting rod 113. The mounting pieces 17 may limit a farthest position of the movement of the moving member towards the engaging blocks 15.

As illustrated in FIG. 4, in this embodiment, there are two bases 114 respectively corresponding to the first locking rod 111 and the second locking rod 112. Each base 114 includes a first wall 1141 located near the connecting rod 113, a second wall 1142 opposite to the first wall 1141. In this embodiment, limiting holes (not shown in the figures) are correspondingly provided in the first wall 1141 and the second wall 1142, so that the first locking rod 111 or the second locking rod 112 respectively pass through the limiting holes of the corresponding first wall 1141. Thus, the first locking rod 111 and the second locking rod 112 are slidably attached to the bases 114. The number of the elastic member 1143 is same as the base 114. The elastic member 1143 and a pushing plate 1144 are located between the first wall 1141 and the second wall 1142 of each base 114. Both of the elastic member 1143 and the pushing plate 1144 are sleeved on the first locking rod 111 or the second locking rod 112. One end (beside the connecting rod 113) of the elastic member 1143 is fixedly connected to the first wall 1141, and the other end is fixedly connected to the pushing plate 1144. The pushing plates 1144 are fixedly connected to the first locking rod 111 and the second locking rod 112. The elastic members 1143 are engaged with the first walls 1141 and the pushing plates 1144 so as to provide a restoring force onto the first locking rod 111 and the second locking rod 112.

The operating principles of locking apparatus 11 is explained in the following.

When unlock the locking apparatus 11 from the locking state, the operating member 116 is operated by a user, which makes the locking apparatus 11 to move relative to the fixing plate 10. The first locking rod 111 and the second locking rod 112 are pulled by the operating member 116 to slide, so as to drive the pushing plates 1144 to move together towards a direction away from the engaging block 15. At this time, one end of the elastic members 1143 connected to the pushing plates 1144 moves with the pushing plates 1144, and the other end is fixedly connected to the first wall 1141, so that the elastic members 1143 are pushed by the pushing plates 1144 and move towards the first wall 1141, thereby the elastic members 1143 are compressed by the pushing plates 1144 and the first walls 1141. The locking apparatus 11 is thus in the unlocked state. When the operating member 116 is released from the user, the locking apparatus 11 is driven to move back until the pushing plates 1144 are resisted by the second walls 1142 by the restoring force from the elastic members 1143. The locking apparatus 11 returns to its original position, reaching the locking state.

Figure 2:
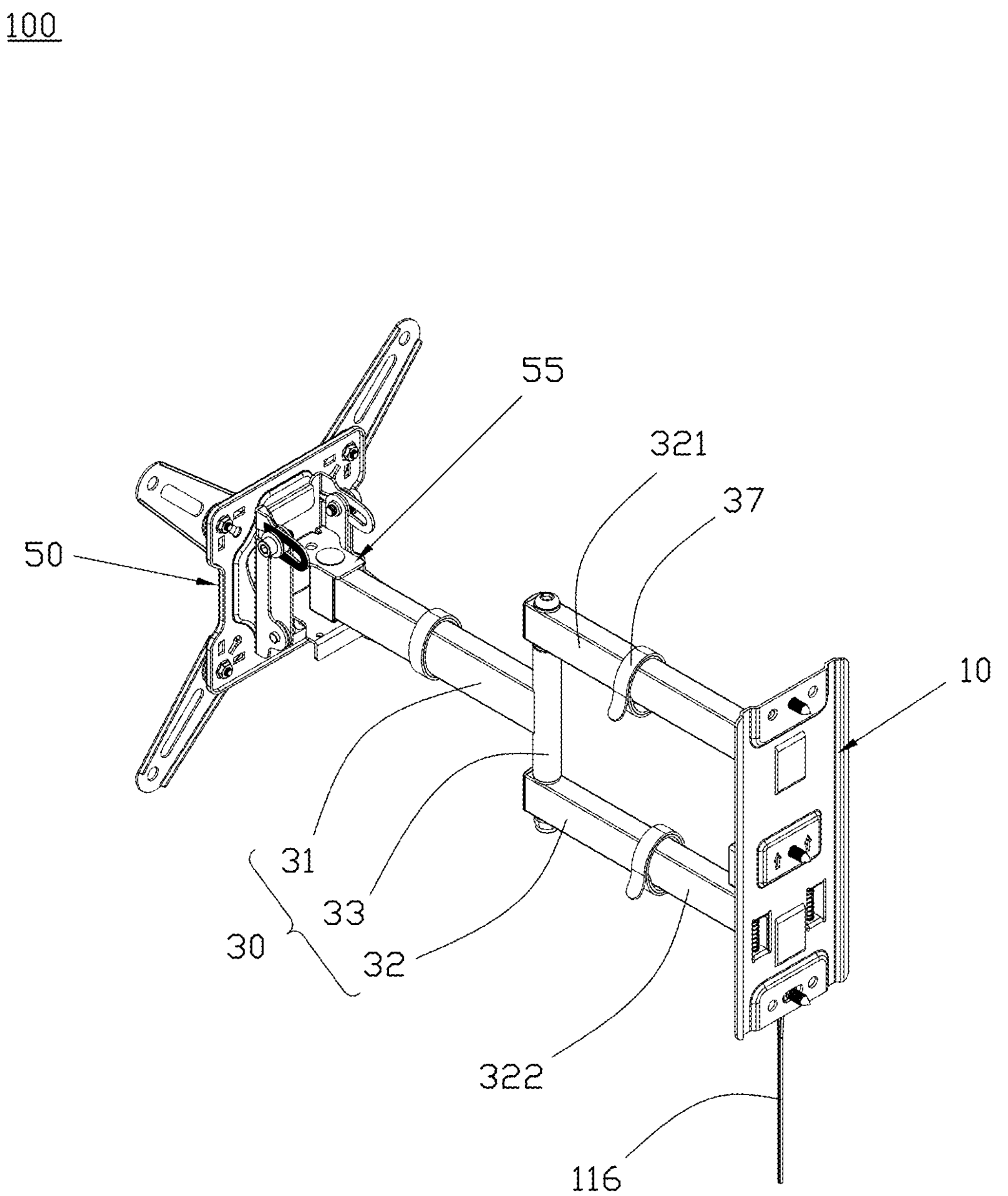
FIG. 2 is a perspective view of the support for the display apparatus shown in FIG. 1 from an opposite view direction.

As illustrated in FIG. 1, and FIG. 2, The rotating arm 30 coupled between the fixing plate 10 and the mounting plate 50 includes a front arm 31 coupled to the mounting plate 50, a rear arm 32 coupled to the fixing plate, and a transverse rod 33 connecting the front arm 31 and the rear arm 32. The rear arm 32 is a dual-arm structure, which includes a first support arm 321 and a second support arm 322 parallel to the first support arm 321. Each of the first support arm 321 and the second support arm 322 has an end accommodated between a corresponding set of mounting pieces 17. In a set of mounting pieces 17, a first through hole (not shown in the figure) is defined through the side peripheral wall of one of the mounting pieces 17, and a second through hole 171 corresponding to the first through hole is defined through the other mounting piece 17. The first support arm 321 is located between the two mounting pieces 17 in the first set of mounting pieces 17, and the second support arm 322 is located between the two mounting pieces 17 in the second set of mounting pieces 17. Two first shaft pins 175 pass through the second through holes 171 of a set of mounting pieces 17 and the first through holes of the corresponding support arms 321 and 322, respectively, so that the mounting pieces 17 and the support arms 321 and 322 are rotatably connected together. Thus, the rotating arm 30 may rotate relative to the fixing plate 10. The other ends of the first support arm 321 and the second support arm 322 are penetrated to form a third through hole (not shown in the figure). The third through hole is defined at each of the other ends of the first support arm 321 and the second support arm 322. The transverse rod 33 passes through the third through hole, so that the transverse rod 33 is rotatably connected to the first support arm 321 and the second support arm 322. The front arm 31 is parallel to the first support arm 321 and the second support arm 322 with one end of the front arm 31 being connected to the middle of the transverse rod 33. The front arm 31 may rotate about the transverse rod 33. A receiving space 35 is defined between the first support arm 321 and the second support arm 322 for accommodating the front arm 31 therein. Specifically, the front arm 31 is a single arm structure, and the front arm 31 and the rear arm 32 are telescopiform structure. The front arm 31 may be stacked in the receiving space 35, increasing the stability of the overall structure and improving its reliability. In addition, the front arm 31 and the rear arm 32 of the support 100 may be folded, thereby improving portability.

In this embodiment, at least one wire clamp 37 is provided on at least one of the first support arm 321, the second support arm 322, and the front arm 31. The wire clamp 37 is used for binding electric wires with the first support arm 321, the second support arm 322, and/or the front arm 31, so as to prevent the electric wires routing and twine of the display apparatus, making it more convenient.

Figure 3:
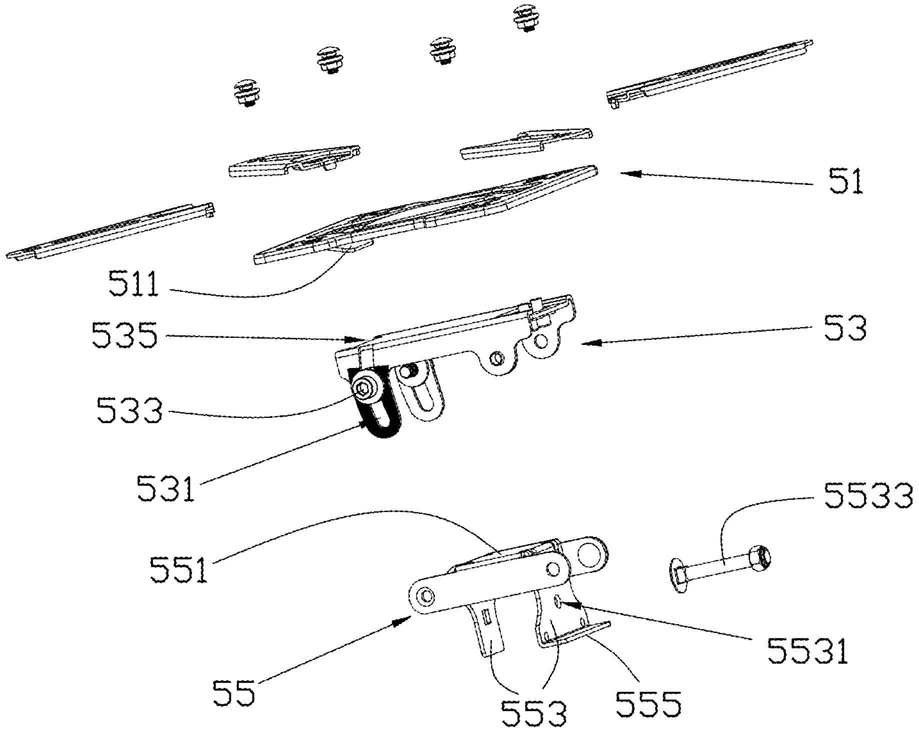
FIG. 3 is an exploded view of a mounting plate of the support for the display apparatus.

As illustrated in FIG. 2, and FIG. 3, the mounting plate 50 includes a back plate 51 on which the display apparatus is directly fixed, a connecting seat 55 connected to the front arm 31, and an adjustable seat 53 coupled between the connecting seat 55 and the back plate 51. One end of the front arm 31 away from the transverse rod 33 is rotatably connected to the adjustable seat 55. The connecting seat 55 includes a main body 551 parallel to the fixing plate 10, and two clamps 553 are extended vertically from both ends of the main body 551 towards the side close to the rotating arm 30. A fourth through hole 5531 is defined in the two clamp 553, and one end of the front arm 31 is clamped between the two clamps 553. The second shaft pin 5533 passes through the fourth through hole 5531 of the clamp 553 and a fifth through hole of the front arm 31, so that the mounting plate 50 and the rotating arm 30 can be rotatably connected together. At least one of the two clamps 553 extends vertically outward from a lowest position to form a locking element 555, which is used to cooperate with the locking apparatus 11 to lock the support 100 and prevent shaking.

One end of the adjustable seat 53 is connected to the connecting seat 55 through a connecting member, such as a screw, and the other end of the adjustable seat 53 is extended towards the side close to the rotating arm 33. A set of waist holes 531 is defined in the other end of the adjustable seat 53. The waist holes 531 are arc-shaped long holes. A waist hole screw 533 passes through the waist holes 531 and the connecting seat 55, thereby the adjustable seat 53 and the connecting seat 55 are connected together. The waist hole screw 533 is slidable in the circular-arc-shaped waist hole 531, so that the adjustable seat 53 is driven to rotate slightly up or down relative to the connecting seat 55, thereby achieving viewing angles of the display apparatus.

A protrusion 511 is obliquely extended downward from a side of the back plate 51 which is near the waist hole 531. A notch 535 is defined at an upper end of the waist hole 531 of the adjustable seat 53 corresponding to the protrusion 511. When the back plate 51 contacts the adjustable seat 53, the protrusion 511 is inserted into the notch 535, so that one end of the back plate 51 are connected to the adjustable seat 53. The above is a connection method between the back plate 51 and the adjustable seat 53, which is used to enhance the stability of the back plate 51 connection and improve the load-bearing capacity.

The folding and locking process of the support 100 is explained in the following.

As illustrated in FIG. 1, the mounting plate 50 is parallel to the fixing plate 10, and the rotating arm 30 is located in a plane which is perpendicular to both the fixing plate 10 and the mounting plate 50. The support 100 is in a fully unfolded state. When folding the display support 100, firstly, the user push the display apparatus to take the mounting plate 50 to rotate. The connecting seat 55 then rotates relative to the rotating arm 30 until the mounting plate 50 is parallel to the front arm 31 of the rotating arm 30. The transverse rod 33 is thus pushed to cause the transverse rod 33 to drive the front arm 31 to rotate until the front arm 31 is received in the receiving space 35. Then, the user operates the operating member 116, causing the locking apparatus 11 to move away its original location towards the side close to the operating member 116. While holding the operating member 116, rotate the rear arm 32 towards one of the two sides until the front arm 31 contacts the engaging block 15, the locking element 555 is located below the position before the first locking rod 111 and the second locking rod 112 move. When the operating member 116 is released, the locking apparatus 11 is returned to an original position by the restoring force of the elastic member 1143. so as to drive the locking device 11 return to its original position. Thus, the locking element 555 is locked by the first locking rod 111 and the second locking rod 112. As illustrated in FIG. 5, at this time, the fixing plate 10, the rotating arm 30, and the mounting plate 50 are parallel to each other, the folding locking process, such as a self-locking process is completed. The front arm 31 and the rear arm 32 are stacked in a same plane with the front arm 31 being protrudes from the rear arm 32. At this time, the mounting plate 50 is parallel to the fixing plate 10.

The support 100 of this embodiment comprises a dual-rod locking structure having a first locking rod 111 and a second locking rod 112. A larger locking range and more stable locking is achieved, when applied to scenarios such as recreational vehicles, the support 100 of this embodiment can provide users with a better use experience.

Hereinto, the technical solution of this present has been described in conjunction with the preferred embodiments shown in the drawings, however, A person skilled in the art should understand that the present disclosure is not limited by the above implementations, and the above implementations and descriptions in the specification are only preferred implementations of the present disclosure and are not intended to limit the present disclosure. without departing from the spirit and scope of the present disclosure, the present disclosure will also have various changes and improvements, and these changes and improvements will fall within the scope of the present disclosure. The scope of protection of the present disclosure is defined by the appended claims and their equivalents.

What is claimed is:

1. A support for a display apparatus, the support comprising:
- a fixing plate configured to connect the support to an object;
- a mounting plate configured to connect the support to the display apparatus;
- a rotating arm connected between the fixing plate and the mounting plate, and configured as a foldable structure, the mounting plate is disposed adjacent to the fixing plate in a condition that the rotating arm is in a folded state, and the mounting plate is spaced apart from the fixing plate in a condition that the rotating arm is in an unfolded state;
- a locking apparatus comprising at least one base fixedly mounted to the fixing plate and a locking member, the locking member connected to the at least one base and configured to move relative to the fixing plate in a first direction away from the fixing plate in response to an external force applied on the locking member, and a locking end of the locking member is movable out of a locking position; and in response to the external force release from the locking member, the locking member moves relative to the mounting plate in a second direction toward the fixing plate, and the locking end returns to the locking position,
- a locking element disposed on the mounting plate, and configured to:
- in the condition that the rotating arm is in the folded state and the locking end moves out of the locking position, the locking element can enter the locking position; and in response to the locking end returned to the locking position, the locking element is locked and engaged with the locking end.

2. The support according to claim 1, wherein,
- the locking member comprises a first locking rod, a second locking rod spaced from the first locking rod, and a connecting rod connecting the first locking rod and the second locking rod.

3. The support according to claim 2, wherein,
- the at least one base comprises a first wall located near the connecting rod, a second wall opposite to the first wall, and an elastic member and a pushing element located between the first wall and the second wall,
- one of the first locking rod and the second locking rod respectively penetrate through the first wall and the second wall, the pushing plate is fixedly mounted on the one of the first locking rod and the second locking rod, and is located between the first wall and the second wall, the elastic member is disposed on the one of the first locking rod and the second locking rod, and is located between the first wall and the second wall, and one end of the elastic member near the connecting rod is fixedly connected to the first wall, another end of the elastic member is fixedly connected to the pushing plate, and in response to the locking member been slid from an original position, the pushing element compresses the elastic member.

4. The support according to claim 3, wherein, the locking apparatus further comprises an operating member operatable externally, the operating member is connected to the connecting rod and move together with the locking member.

5. The support according to claim 4, wherein, each of the first wall and the second wall includes a hole, and the one of the first locking rod and the second locking rod penetrates through the hole of the first wall and the hole of the second wall.

6. The support according to claim 5, further comprising an engaging block protruding from the fixing plate towards the mounting plate, wherein, in the condition that the rotating arm is in the folded state, a sidewall of the rotating arm contacts with the engaging block and is supported by the engaging block.

7. The support according to claim 6, wherein, the fixing plate further comprises at least two mounting pieces, the at least two mounting pieces are arranged at an interval to form a rotating space, one end of the rotating arm is inserted into the rotating space and rotatably connect to the at least two mounting pieces.

8. The support according to claim 7, wherein, the rotating arm comprises a front arm connected to the mounting plate, a rear arm connected to the fixing plate, and a transverse rod configured for connecting the front arm and the rear arm, the rear arm defines a receiving space configured for receiving at least a portion of the front arm, and one end of the rear arm is inserted into the rotating space, one end of the front arm is connected to the transverse rod, and the transverse rod is rotatably connected to another end of the rear arm, such that the front arm is stackable in the receiving space, and another end of the front arm is rotatably connected to the mounting plate.

9. The support according to claim 8, wherein, the mounting plate comprises a back plate configured for directly fixing the display apparatus, a connecting seat connected to the front arm, and an adjustable seat between the back plate and the connecting seat, the connecting seat comprises a main body in contact with the adjustable seat, and a clamp formed by extending vertically from both ends of the main body to a side away from the back plate, and the locking element extending from one end of the clamp away from the back plate.

10. The support according to claim 9, wherein, one end of the adjustable seat extends towards one side close to the connecting seat to form a set of waist holes, the waist holes are penetrated with waist hole screws, and the waist hole screws are inserted into the connecting seat, so that the connecting seat and the adjustable seat are connected through the waist hole screws, and the waist hole screws are slidable inside the set of waist holes.

11. The support according to claim 9, further comprising a protrusion obliquely extended downward from a side of the back plate facing the adjustable seat, wherein, an end of the adjustable seat is formed with a notch corresponding to the protrusion, in a condition that the back plate is connected to the adjustable seat, the protrusion is inserted into a notch.

12. A support for a display apparatus, the support comprising:

a fixing plate configured to connect the support to an object;

a mounting plate configured to mount the display apparatus;

a rotating arm rotatably connected to the fixing plate and the mounting plate;

a locking apparatus comprising at least one base fastened on the fixing plate and a locking member attached to the at least one base and movable relative to the fixing plate, wherein the locking member comprises a first locking rod, a second locking rod spaced from the first locking rod, and a connecting rod connecting the first locking rod and the second locking rod; and a locking element disposed on the mounting plate, wherein in a condition that the rotating arm is in a folded state, the locking element is engageable with the locking apparatus for locking the mounting plate;

wherein the at least one base comprises a first wall located near the connecting rod, a second wall opposite to the first wall, and an elastic member and a pushing element located between the first wall and the second wall, one of the first locking rod and the second locking rod respectively penetrate through the first wall and the second wall, the pushing plate is fixedly mounted on the one of the first locking rod and the second locking rod, and is located between the first wall and the second wall, the elastic member is disposed on the one of the first locking rod and the second locking rod, and is located between the first wall and the second wall, and one end of the elastic member near the connecting rod is fixedly connected to the first wall, another end of the elastic member is fixedly connected to the pushing plate, and in response to the locking member been slid from an original position, the pushing element compresses the elastic member.

13. The support according to claim 12, wherein, the locking apparatus further comprises an operating member operatable externally, the operating member is connected to the connecting rod and move together with the locking member.

14. The support according to claim 13, wherein, each of the first wall and the second wall defines a hole, and the one of the first locking rod and the second locking rod penetrates through the hole of the first wall and the hole of the second wall.

15. The support according to claim 14, further comprising an engaging block protruding from the fixing plate towards the mounting plate, wherein, in the condition that the rotating arm is in the folded state, a sidewall of the rotating arm contacts with the engaging block and is supported by the engaging block.

16. The support according to claim 15, wherein, the fixing plate further comprises at least two mounting pieces, the at least two mounting pieces are arranged at an interval to form a rotating space, one end of the rotating arm is inserted into the rotating space and rotatably connect to the at least two mounting pieces.

17. The support according to claim 16, wherein, the rotating arm comprises a front arm connected to the mounting plate, a rear arm connected to the fixing plate, and a transverse rod configured for connecting the front arm and the rear arm, the rear arm defines a receiving space configured for receiving at least a portion of the front arm, and one end of the rear arm is inserted into the rotating space, one end of the front arm is connected to the transverse rod, and the transverse rod is rotatably connected to another end of the rear arm, such that the front arm is stackable in the receiving space, and another end of the front arm is rotatably connected to the mounting plate.

18. The support according to claim 17, wherein, the mounting plate comprises a back plate configured for directly fixing the display apparatus, a connecting seat connected to the front arm, and an adjustable seat between the back plate and the connecting seat, the connecting seat comprises a main body in contact with the adjustable seat, and a clamp formed by extending vertically from both ends of the main body to a side away from the back plate, and the locking element extending from one end of the clamp away from the back plate.

19. The support according to claim 18, wherein, one end of the adjustable seat extends towards one side close to the connecting seat to form a set of waist holes, the waist holes are penetrated with waist hole screws, and the waist hole screws are inserted into the connecting seat, so that the connecting seat and the adjustable seat are connected through the waist hole screws, and the waist hole screws are slidable inside the set of waist holes.

20. The support according to claim 18, further comprising a protrusion obliquely extended downward from a side of the back plate facing the adjustable seat, wherein, an end of the adjustable seat is formed with a notch corresponding to the protrusion, in a condition that the back plate is connected to the adjustable seat, the protrusion is inserted into a notch.

* * * * *